United States Patent
Seefried et al.

(10) Patent No.: US 12,365,497 B2
(45) Date of Patent: Jul. 22, 2025

(54) SYSTEM FOR THE PREPARATION OF A PACKAGED FOOD COMPOSITION

(71) Applicant: SOCIETE DES PRODUITS NESTLE S.A., Vevey (CH)

(72) Inventors: Jurgen Seefried, Rielasingen-Worblingen (DE); Johannes Peter Thoma, Radolfzell (DE); Roberto Leal, Singen (DE); Lluis Guiteras Mombiola, Ins (CH)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 530 days.

(21) Appl. No.: 17/754,314

(22) PCT Filed: Sep. 30, 2020

(86) PCT No.: PCT/EP2020/077286
§ 371 (c)(1),
(2) Date: Mar. 30, 2022

(87) PCT Pub. No.: WO2021/063976
PCT Pub. Date: Apr. 8, 2021

(65) Prior Publication Data
US 2022/0340311 A1    Oct. 27, 2022

(30) Foreign Application Priority Data
Oct. 1, 2019   (EP) ..................... 19200706

(51) Int. Cl.
| | | |
|---|---|---|
| *B65B 1/32* | (2006.01) | |
| *A23L 5/30* | (2016.01) | |
| *B01F 35/21* | (2022.01) | |
| *B01F 35/22* | (2022.01) | |
| *B65B 3/28* | (2006.01) | |
| *B65B 25/00* | (2006.01) | |
| *B65B 57/14* | (2006.01) | |
| *G01G 19/38* | (2006.01) | |
| *B01F 101/06* | (2022.01) | |

(52) U.S. Cl.
CPC .............. *B65B 1/32* (2013.01); *A23L 5/30* (2016.08); *B01F 35/2117* (2022.01); *B01F 35/2209* (2022.01); *B65B 3/28* (2013.01); *B65B 25/001* (2013.01); *B65B 57/14* (2013.01); *G01G 19/38* (2013.01); *A23V 2002/00* (2013.01); *B01F 2101/06* (2022.01); *B65B 2210/06* (2013.01)

(58) Field of Classification Search
CPC ........ A47J 27/14; B65B 1/32; B65B 2210/06; B65B 2210/08; B65B 25/001; B65B 3/28; B65B 57/14; B65B 57/145; B65B 2220/14; B65B 65/003–08; B65B 1/06; B65B 51/07; B65B 61/02; A23L 5/30; A23V 2002/00; B01F 27/00; B01F 27/05; B01F 27/21; B01F 35/13; B01F 33/84–848; B01F 2101/06; A23N 17/007; B25J 9/0084–0096
USPC ............ 99/348, 356–357, 360, 443 R–443 C, 486; 426/232; 366/141
See application file for complete search history.

(56) References Cited

U.S. PATENT DOCUMENTS

| | | | |
|---|---|---|---|
| 4,919,950 A | | 4/1990 | Mak |
| 10,455,987 B1 * | | 10/2019 | He .................... A47J 27/14 |
| 11,518,022 B1 * | | 12/2022 | Pajevic ............... B65G 43/08 |
| 2011/0261641 A1 | | 10/2011 | Barbi |
| 2012/0151877 A1 * | | 6/2012 | Stamm Kristensen ..................... A23N 17/007 53/111 R |
| 2014/0287132 A1 | | 9/2014 | Watson et al. |
| 2017/0308675 A1 | | 10/2017 | Parviainen |
| 2017/0348854 A1 | | 12/2017 | Oleynik |
| 2018/0075506 A1 * | | 3/2018 | Burkhard ............. B65G 23/23 |
| 2019/0069722 A1 * | | 3/2019 | He ..................... A47J 37/1228 |
| 2019/0073648 A1 | | 3/2019 | Salvucci et al. |

FOREIGN PATENT DOCUMENTS

| | | |
|---|---|---|
| CN | 1649771 A | 8/2005 |
| CN | 105292892 A | 2/2016 |
| CN | 108706162 A | 10/2018 |
| CN | 109475129 A | 3/2019 |
| CN | 109803893 A | 5/2019 |
| CN | 109814505 A | 5/2019 |
| CN | 109843730 A | 6/2019 |
| CN | 209410469 U | 9/2019 |
| WO | 2012175311 | 12/2012 |

OTHER PUBLICATIONS

Chinese Office Action for Appl No. 202080062701.1 dated Aug. 31, 2024, 9 pages.
Chinese Office Action for Appl No. 202080062701.1 dated Jan. 24, 2024.

* cited by examiner

*Primary Examiner* — Sang Y Paik
*Assistant Examiner* — Bonita Khlok
(74) *Attorney, Agent, or Firm* — Calfee, Halter & Griswold LLP

(57) ABSTRACT

The present invention relates to a system for the preparation of a packaged food composition, wherein the system comprises a collecting unit, a weighing unit, a mixing unit, a filling unit, transferring units and a control unit.

10 Claims, No Drawings

SYSTEM FOR THE PREPARATION OF A PACKAGED FOOD COMPOSITION

CROSS REFERENCE TO RELATED APPLICATION

The present application is a National Stage of International Application No. PCT/EP2020/077286, filed on Sep. 30, 2020, which claims priority to European Patent Application No. 19200706.0, filed on Oct. 1, 2019, the entire contents of which are being incorporated herein by reference.

The present invention relates to a system for the preparation of a packaged food composition. In particular, the present invention relates to a system for the preparation of a packaged food composition, wherein the system comprises a collecting unit, a weighing unit, a mixing unit, a filling unit, transferring units and a control unit.

Nowadays, it is well known, that machines are involved in most or all process steps for the preparation of a packed food composition. Operators handle the different machines involved. This can lead to errors from the operator or different accurate working behaviours of operators and therefore to non-repeatability or a higher standard derivation of reproducibility during the production of a packed food composition. Also inactive times due to sick leave of an operator are possible. In addition, the risk of foreign bodies such as hair, plaster, band-aid or jewellery from the operator in the product might be increased.

A system for an automated process for the preparation of a packed food composition is not described in the prior art. Such kind of an automated system has certain advantages. The system for the preparation of a packaged food composition is able to produce 24 hours 7 days with only little human supervision. None inactive times due to sick leave of a human occurs. No possible accidents of human occur during the handling of machines. In addition, the error rate is very small or zero delivering providing a repeatability of the manufacturing process and the products prepared. The whole process and product will have a very small standard deviation of reproducibility. No foreign bodies from human such as hair, plaster, band-aid or jewellery occur. The system is especially for 5 to 1000 kg batches and can therefore provide very flexible, personalized products (organic, free from allergen, vegan etc).

SUMMARY OF THE INVENTION

The object of the present invention is to improve the state of the art and to provide an improved or at least an alternative solution to overcome at least some of the inconveniences described above. The object of the present invention is achieved by the subject matter of the independent claims. The dependent claims further develop the idea of the present invention.

Particularly, the object of the present invention is to provide a system for the preparation of a packaged food composition able to produce 24 hours 7 days with only little human supervision. In addition the system for the preparation of a packaged food composition has an error rate less than 3%, preferably less than 2%, preferably less than 1%, preferably having no error rate at all, and/or has a standard deviation of reproducibility less than 3%, preferably less than 2%, preferably less than 1%. In addition, no foreign bodies from human operator occur as well as no accidents from human.

Accordingly, the present invention provides in a first aspect a system for the preparation of a packaged food composition, the system comprising:
  a collecting unit for collecting food ingredients in primary containers;
  a primary transferring unit for transferring the primary containers with the food ingredients from the collecting unit to a weighing unit;
  a weighing unit for weighing and dispensing food ingredients from the primary containers into a secondary container;
  a secondary transferring unit for transferring the secondary containers with the weighed food ingredients to a mixing unit;
  a mixing unit for mixing the weighed food ingredients;
  a tertiary transferring unit for transferring the mixed weighed food ingredients to a filling unit;
  a filling unit for filling the mixed weighed food ingredients into packages;
  a control unit;
wherein the control unit controls and directs the collecting unit, the weighing unit, the mixing unit, the filling unit, and the primary, secondary and tertiary transferring units in such a way as to compose, mix and pack a food composition starting from the food ingredients present in the primary containers according to a composition recipe stored in the control unit in an electronic form to result in the packaged food composition.

Accordingly, the present invention provides in a second aspect a method for preparing a packaged food composition with a control unit, the method comprising:
  collecting food ingredients in primary containers from a warehouse;
  transferring the primary containers with the food ingredients to a weighing unit;
  weighing and dispensing the food ingredients from the primary containers into a secondary container;
  transferring the secondary containers with the weighed food ingredients to a mixing unit;
  mixing the weighed food ingredients;
  transferring the mixed weighed food ingredients to a filling unit;
  filling the mixed weighed food ingredients into packages;
wherein the control unit has stored a composition recipe in an electronic form and controls and directs the collecting of food ingredients in primary containers, the transferring the primary containers, the weighing and dispensing the food ingredients, the transferring the secondary containers, the mixing of the weighed food ingredients, the transferring of the mixed weighed food ingredients and the filling of the mixed weighed food ingredients into packages.

It has been surprisingly found by the inventors that by a system for the preparation of a packaged food composition and the system comprising a collecting unit, a weighing unit, a mixing unit, a filling unit, transferring units and a control unit, wherein the control unit controls and directs the collecting unit, the weighing unit, the mixing unit, the filling unit, and the transferring units in such a way as to compose, mix and pack a food composition starting from food ingredients present in containers according to a composition recipe stored in the control unit in an electronic form to result in the packaged food composition, result in a process able to produce 24 hours 7 days with only little human supervision, having an error rate less than 3%, having a standard deviation of reproducibility less than 3%, and no foreign bodies from human operator occur.

DETAILED DESCRIPTION OF THE INVENTION

In a first aspect the present invention pertains to a system for the preparation of a packaged food composition, the system comprising:
- a collecting unit for collecting food ingredients in primary containers;
- a primary transferring unit for transferring the primary containers with the food ingredients from the collecting unit to a weighing unit;
- a weighing unit for weighing and dispensing food ingredients from the primary containers into a secondary container;
- a secondary transferring unit for transferring the secondary containers with the weighed food ingredients to a mixing unit;
- a mixing unit for mixing the weighed food ingredients;
- a tertiary transferring unit for transferring the mixed weighed food ingredients to a filling unit;
- a filling unit for filling the mixed weighed food ingredients into packages;
- a control unit;

wherein the control unit controls and directs the collecting unit, the weighing unit, the mixing unit, the filling unit, and the primary, secondary and tertiary transferring units in such a way as to compose, mix and pack a food composition starting from the food ingredients present in the primary containers according to a composition recipe stored in the control unit in an electronic form to result in the packaged food composition.

In a preferred aspect the present invention pertains to a system for the preparation of a packaged food composition, the system comprising:
- a collecting unit for collecting food ingredients in primary containers;
- a primary transferring unit for transferring the primary containers with the food ingredients from the collecting unit to a weighing unit;
- a weighing unit for weighing and dispensing food ingredients from the primary containers into a secondary container;
- a secondary transferring unit for transferring the secondary containers with the weighed food ingredients to a mixing unit;
- a mixing unit for mixing the weighed food ingredients;
- a tertiary transferring unit for transferring the mixed weighed food ingredients to a filling unit;
- a filling unit for filling the mixed weighed food ingredients into packages;
- a control unit;
- a cleaning unit for cleaning used equipment;
- a quaternary transferring unit for transferring the used equipment to the cleaning unit.

wherein the control unit controls and directs the collecting unit, the weighing unit, the mixing unit, the filling unit, and the primary, secondary and tertiary transferring units in such a way as to compose, mix and pack a food composition starting from the food ingredients present in the primary containers according to a composition recipe stored in the control unit in an electronic form to result in the packaged food composition.

In a second aspect the present invention pertains to a method for preparing a packaged food composition with a control unit, the method comprising:
- collecting food ingredients in primary containers from a warehouse;
- transferring the primary containers with the food ingredients to a weighing unit;
- weighing and dispensing the food ingredients from the primary containers into a secondary container;
- transferring the secondary containers with the weighed food ingredients to a mixing unit; mixing the weighed food ingredients;
- transferring the mixed weighed food ingredients to a filling unit;
- filling the mixed weighed food ingredients into packages;

wherein the control unit has stored a composition recipe in an electronic form and controls and directs the collecting of food ingredients in primary containers, the transferring the primary containers, the weighing and dispensing the food ingredients, the transferring the secondary containers, the mixing of the weighed food ingredients, the transferring of the mixed weighed food ingredients and the filling of the mixed weighed food ingredients into packages.

The term "collecting unit" is a robot in a warehouse, where all food ingredients are stored in containers (primary containers). All containers are traceable by a RFID (radio frequency identification) chip. The robot automated collects the ingredients needed for a food composition and place them back after usage. A suitable robot is for example ABB-IRB-6700. In a preferred embodiment, the collecting unit is a robot in a warehouse on rail.

The term "primary transferring unit" is an automated transfer of the containers (primary containers) collected from the collecting unit to a weighing unit. In a preferred embodiment, the primary transferring unit is a robot in the warehouse on rail. In another embodiment, the primary transferring unit is an automated guided vehicle such as Eagle-Ant0 or Eagle-Ant1.

The term "food ingredients" are ingredients used in a food composition. In an embodiment the packaged food composition comprises at least 2 food ingredients, preferably between 2 to 25 food ingredients, preferably between 2 to 20 food ingredients, preferably between 2 to 15 food ingredients, preferably between 2 to 10 food ingredients. In a preferred embodiment food ingredients are selected from salt, monosodium glutamate, sugar, citric acid anhydrous, fat, oil, yeast extract, colorants, maltodextrin, starches, flours, vegetable extract, glucose syrup, onion powder, flavouring agents, herbs, spices, vegetables, meat or fish components (in wet or powder form). Flavouring agents can include parsley, celery, fenugreek, lovage, rosemary, marjoram, dill, tarragon, coriander, ginger, lemongrass, curcuma, chili, ginger, paprika, mustard, garlic, onion, turmeric, tomato, coconut milk, cheese, oregano, thyme, basil, chillies, paprika, tomato, pimento, jalapeno pepper, white pepper powder and black pepper.

The term "weighing unit" is at least one robot for weighing and dispensing food ingredients from primary containers in secondary containers. A suitable robot is for example ABB-IRB-6700. A robot take the primary containers and place the primary containers on a dosing station, where the weighing process occur. If the primary container is not anymore required, it is put back to the collection unit. If the primary container is empty, it will be rejected for cleaning and/or refilling.

The term "secondary transferring unit" is an automated transfer of the weighed secondary containers to a mixing unit. In an embodiment, the weighed secondary containers are palletized after weighing. In a preferred embodiment, the secondary transferring unit is an automated guided vehicle such as Eagle-AntO or Eagle-Ant1.

The term "mixing unit" is mixing the weighed food ingredients in a mixer to a food composition. In an embodiment, a robot is putting the food ingredients of the secondary containers according to a mixing sequence into a mixer comprising a mixer drum. The mixing process ends, when the desired mixing quality of the food composition is achieved. The mixing unit can be monitored by NIR (near-infrared) sensors. In an embodiment, the weighed mixed food composition is filled in a dedicated container, which can later be docked onto the filling machine. In an embodiment, the mixing drum including mixing tool can be removed by a robot from the mixing unit and transferred by an AGV to a dedicated cleaning unit. Inside the cleaning unit, the mixing drum and the containers can get cleaned, preferably wet cleaned, fully automatically. After cleaning, the equipment will be transferred to an equipment storage area until it is required again or transferred to the mixing unit.

The term "filling unit" is for filling the mixed weighed food ingredients into packages. The filling unit is an automatic fill and pack process, which is capable to handle rigid plastic containers and pouches. Depending on the final product, the packaging format will be chosen. A robot is picking a shuttle which is used as a carrier system for the pouches. With this shuttle, the robot picks up the pouch at one of multiple pouch magazines. Being loaded with the pouch, the shuttle will be placed on a conveyor system and released from the robot. The pouch will then be labelled, filled and sealed. All needed equipment is modular and mobile and can get removed from the line for wet cleaning and be replaced by a spare module to keep running production without (long) interruption. When the pouch is sealed, a second robot will grap the shuttle, open it and release the pouch to the checkweigher. The shuttle will be placed on a conveyor system and can be used again for another pouch. After the checkweigher, the pouch will enter a tray packer and will be placed into a carton. After the tray packer, the carton will pass through a shrink tunnel and enter a palletizing cell. The final palletized pallet will be ready to leave the factory to either a distribution center or to the customer.

In case of refilling the magazines, the materials will be provided by AGVs. The change/refill of the filler will be done fully automatic by a third robot which can dock the containers from the mixing area on top of the filling module.

The term "cleaning unit" is for cleaning used equipment, preferably drum mixer or containers. In the cleaning unit, the used equipment is cleaned fully automatically. In an embodiment, the cleaning is done by dry ice cleaning, laser cleaning, wet cleaning or any combination thereof, preferably wet cleaning. After cleaning, the equipment will be transferred by AVG to an equipment storage area until it is required again or transferred to the mixing unit.

The term "control unit" controls all units to compose, mix and pack a food composition starting from the food ingredients present in the primary containers according to a composition recipe stored in the control unit in an electronic form to result in the packaged food composition. In an embodiment the control unit controls and directs the collecting unit, the weighing unit, the mixing unit, the filling unit, all transferring units (primary transferring unit, secondary transferring units, tertiary transferring units) in such a way as to compose, mix and pack a food composition starting from the food ingredients present in the primary containers according to a composition recipe stored in the control unit in an electronic form to result in the packaged food composition. In a preferred embodiment the control unit is a computer. A computer is a machine that can be instructed to carry out sequences of arithmetic or logical operations automatically via computer programming.

The invention claimed is:

1. An automatic system for a preparation of a packaged food composition, the system comprising:
    a collecting unit for collecting food ingredients in primary containers;
    a primary transferring unit for transferring the primary containers with the food ingredients from the collecting unit to a weighing unit;
    a weighing unit for weighing and dispensing food ingredients from the primary containers into secondary containers;
    a secondary transferring unit for transferring the secondary containers with the weighed food ingredients to a mixing unit;
    a mixing unit for mixing the weighed food ingredients;
    a tertiary transferring unit for transferring the mixed weighed food ingredients to a filling unit;
    a filling unit for filling the mixed weighed food ingredients into packages;
    a control unit; and
    wherein the control unit controls and directs the collecting unit, the weighing unit, the mixing unit, the filling unit, and the primary, secondary and tertiary transferring units in such a way as to compose, mix and pack a food composition starting from the food ingredients present in the primary containers according to a composition recipe stored in the control unit in an electronic form to result in the packaged food composition,
    wherein the secondary transferring unit is an automated guided vehicle, and
    wherein the mixing of the weighed food ingredients follows a mixing sequence,
    wherein the filling unit is capable to handle rigid plastic containers and pouches.

2. The automatic system for the preparation of a packaged food composition as claimed in claim 1, wherein the control unit is a computer.

3. The automatic system for the preparation of a packaged food composition as claimed in claim 1, wherein the packaged food composition comprises at least 2 food ingredients.

4. The automatic system for the preparation of a packaged food composition as claimed in claim 1, wherein the food composition is selected from the group consisting of a bouillon, sauce, seasoning, soup, confectionary product, and a beverage powder.

5. The automatic system for the preparation of a packaged food composition as claimed in claim 1, wherein the primary containers and the secondary containers are traceable by a RFID chip.

6. The automatic system for the preparation of a packaged food composition as claimed in claim 1 wherein the collecting unit is a robot in a warehouse.

7. The automatic system for the preparation of a packaged food composition as claimed in claim 1, wherein the collecting unit is a robot in a warehouse on rail.

8. The automatic system for the preparation of a packaged food composition as claimed in claim 1, wherein the mixing of the weighed food ingredients is monitored by NIR sensors.

9. The automatic system for the preparation of a packaged food composition as claimed in claim 1, wherein the system further comprises a cleaning tank for cleaning a used equipment and a quaternary transferring unit for transferring the used equipment to the cleaning tank, wherein the used equipment is an empty container or a mixer drum.

10. The automatic system for the preparation of a packaged food composition as claimed in claim 9, wherein the used equipment is transferred by an automated guided vehicle.

* * * * *